United States Patent [19]

Bennett

[11] Patent Number: 4,885,638
[45] Date of Patent: Dec. 5, 1989

[54] VIDEO DEVICE SYNCHRONIZATION SYSTEM

[75] Inventor: Phillip P. Bennett, San Mateo, Calif.

[73] Assignee: Ampex Corporation, Redwood City, Calif.

[21] Appl. No.: 188,093

[22] Filed: Apr. 27, 1988

Related U.S. Application Data

[60] Continuation of Ser. No. 745,567, Jun. 17, 1985, abandoned, which is a division of Ser. No. 363,670, Mar. 31, 1982, Pat. No. 4,532,547.

[51] Int. Cl.⁴ .............................................. H04N 5/04
[52] U.S. Cl. .................................... 358/148; 358/149; 358/158
[58] Field of Search .................. 358/148, 158, 159, 17, 358/19, 150, 319, 320, 337; 331/1 A; 375/111, 118; 307/516, 525, 526, 527, 528, 510; 328/133, 134, 155

[56] References Cited

U.S. PATENT DOCUMENTS

| | | | |
|---|---|---|---|
| 3,555,185 | 1/1968 | Pierrefonds | 358/149 |
| 3,629,611 | 12/1971 | Limberg | 307/526 |
| 3,758,720 | 9/1973 | Dinn | 358/149 |
| 3,824,340 | 7/1974 | Sensney | 358/149 |
| 4,131,856 | 12/1978 | Chapman | 328/133 |
| 4,215,376 | 7/1980 | Mach | 358/148 |
| 4,253,116 | 2/1981 | Rodgers, III | 358/149 |
| 4,283,662 | 8/1981 | Ainscow et al. | 358/148 |
| 4,488,170 | 12/1984 | Nillesen | 358/148 |
| 4,532,547 | 7/1985 | Bennett | 358/148 |

FOREIGN PATENT DOCUMENTS

0159069 9/1985 Japan ................................... 358/150

Primary Examiner—James J. Groody
Assistant Examiner—David E. Harvey
Attorney, Agent, or Firm—Robert K. Schumacher; Ralph L. Mossino; Richard P. Lange

[57] ABSTRACT

A TV video signal synchronization signal system enables a video device such as a digital special effects system to operate synchronously in response to an input video signal and still produce an output video signal synchronized to a television studio locking reference signal. The video device and the synchronization signal generating subsystem thereof operate in response to a pixel rate clock of approximately 70 ns and in response to a phase command to generate timing for the horizontal sync pulse, color burst signal and video data of the output video signal. The output color burst signal remains phase locked to the locking reference signal with output gating being responsive to the phase command. A ROM interpolator provides subpixel accuracy for the output horizontal sync pulse while output line buffering and interpolation permits the output video data to be phase matched to the reference master sync signal. The entire video system thus operates synchronously with the input video signal to avoid noise interference problems which result from multiple phase clock signals while generating a composite output video signal that is properly phase synchronized with a studio locking reference signal.

5 Claims, 7 Drawing Sheets

VIDEO DEVICE SYNCHRONIZATION SYSTEM

This is a continuation of co-pending application Ser. No. 745,567, filed on June 17, 1985, now abandoned, which is a divisional of Ser. No. 363,670, filed Mar. 31, 1982, now U.S. Pat. No. 4,532,547.

BACKGROUND OF THE INVENTION

1. Field of the Invention

This invention relates to a video signal synchronization system for a television device and more particularly to a synchronization signal generator which permits timing and clock signals for a device to remain phase locked to an input video signal while providing a composite output video signal that is in proper phase relationship to a studio locking reference signal.

2. Discussion of the Prior Art

Commercial television studios typically have a switcher which is connected to receive up to 24 video input signals. These signals may be generated by a variety of sources including local cameras, video recorders, and remote cameras. A given video signal may be coupled to a first switcher input and simultaneously coupled through a special effects device to a second switcher input. The switcher may select, under operator control, any one of these input signals for output as the television broadcast signal.

The signal information for each horizontal line of a television video image contains three components which are particularly critical to proper operation of a television receiver. Each video line begins with a short horizontal sync pulse which operates to stabilize the phase and frequency of a horizontal oscillator in a television receiver. The horizontal sync pulse is followed closely by a color subcarrier or color burst signal. This signal component provides a color reference to help stabilize the color displayed by a receiver. This is a sine wave signal having a rather critical phase tolerance and a less critical tolerance as to the time window during which the signal component is generated. Finally the video data signal component itself is transmitted. Phase or time tolerances of plus or minus 70 nanoseconds for the start of the color burst component are tolerable. All of the above signal components and tolerances are defined by established standards.

If these three signal components are not within designated tolerances with respect to phase when the switcher changes from one input to another, television receivers will manifest undesirable characteristics such as rolling of the video image or color discontinuity. A significant effort is required to maintain all of the incoming signals to the switcher in tolerance. The studio generates a locking reference signal defining a reference horizontal sync pulse and color burst phase condition. This locking reference signal is presented to studio devices such as cameras and video recorders to permit these devices to operate in a common phase relationship. These devices further include manual phase adjustments for the horizontal sync pulse phase and the color subcarrier phase to account for varying factors such as different cable lengths so as to maintain the proper phase relationships at the switcher inputs. These manual adjustments must be frequently readjusted in order to maintain the many video signal components properly in phase at the inputs to the switcher.

A special problem is presented by a video signal manipulating device such as a video special effects system which must receive a signal from another source, transform or operate upon the signal in some way and then present the transformed signal to the switcher.

Typically a signal generator such as a camera is synchronized by the master sync signal and synchronously provides a generated video signal as one input to the video switcher. The video signal is then coupled in parallel through an auxiliary switcher to a transform device such as a digital special effects system. The output of the transform device is then coupled back as a second input to the switcher. The transform device may provide a nominal delay of one frame or some other integral number of frames so that the output is in phase with the input. However, the auxiliary switcher and cable delays as the signal passes through connecting cables impose phase delays which preclude the transformed video signal and the original video signal from both being properly phased at the video switcher. Furthermore, phase variations at other inputs to the switcher further increase the phase variations among all of the video signal inputs.

In prior systems this problem was solved by providing separate input and output clocking systems at the transforming video device. The input portion of the device can then be phase synchronized to the input video signal while the output portion is synchronized to the master sync signal. However, the provision of separate clocking signals is expensive and for complicated systems wherein the two clocking signals must be distributed over large printed circuit board surface areas, the phase differences of the clock signals frequently provide cross talk noise problems which result in unsatisfactory operation of the device.

The present invention solves this problem by operating the video device totally under control of a single pixel rate clock signal in synchronization with the input video signal. At the output, a sync generator responds to a phase difference between the input video signal and the master sync signal to properly adjust the phase of the output video signal relative to the phase of the input video signal to provide a properly phased output video signal. This adjustment occurs under control of the system input signal phase synchronized clock signal to avoid interference between clock signals of different phases.

SUMMARY OF THE INVENTION

A video device in accordance with the invention receives and processes a composite video input signal to generate a composite video output signal. The video device, for example, might be a digital special effects device providing specialized functions such as translation, enlargement, compression, rotation, and perspective rotation. The device is synchronized with the video input signal and operates to sample and process video data in response to a system pixel rate digital clock signal that is also synchronized to the video input signal. The device delays data passing therethrough by substantially one frame time so that output video data remains substantially in phase with the input video data.

However, there are many situations in which the output video data must be synchronous with a master synchronization signal that may have a phase difference relative to the input video signal. The video device thus includes a synchronization system that remains responsive to the system digital lock signal while generating synchronizing and control pulses in synchronism with the master synchronization signal. By buffering the lines of output video data, the phase of the output video data can be shifted to match the phase of the master synchronization signal so long as the required phase shift does not exceed the horizontal blanking interval. Any further phase shift would require an increase in the output buffer storage.

The video device synchronization system operates under control of the system pixel rate clock and includes a phase detector coupled to receive a video device synchronization signal such as horizontal sync and a reference sync component of a locking reference signal and generate a phase difference signal indicative of the phase difference therebetween, and a signal generator coupled to receive the video device synchronization signal and a phase difference command signal that is responsive to the phase difference signal and generate as an output, a composite video signal having a phase difference relative to the video device synchronization signal indicated by the phase difference command.

The phase detector accumulates a count over a period of 128 lines during each frame to improve the accuracy of the offset adjust phase count. The offset adjust phase count is added to a manual offset adjustment to generate a phase difference command signal in the form of a count that is used to preset a pixel rate phase control counter at the beginning of each frame of the input video signal. The phase of the output video signal may thus be controlled while the video device operates synchronously with the input video signal.

BRIEF DESCRIPTION OF THE DRAWINGS

A better understanding of the invention may be had from a consideration of the following detailed description, taken in conjunction with the accompanying drawings in which.

DETAILED DESCRIPTION

Figure 1:
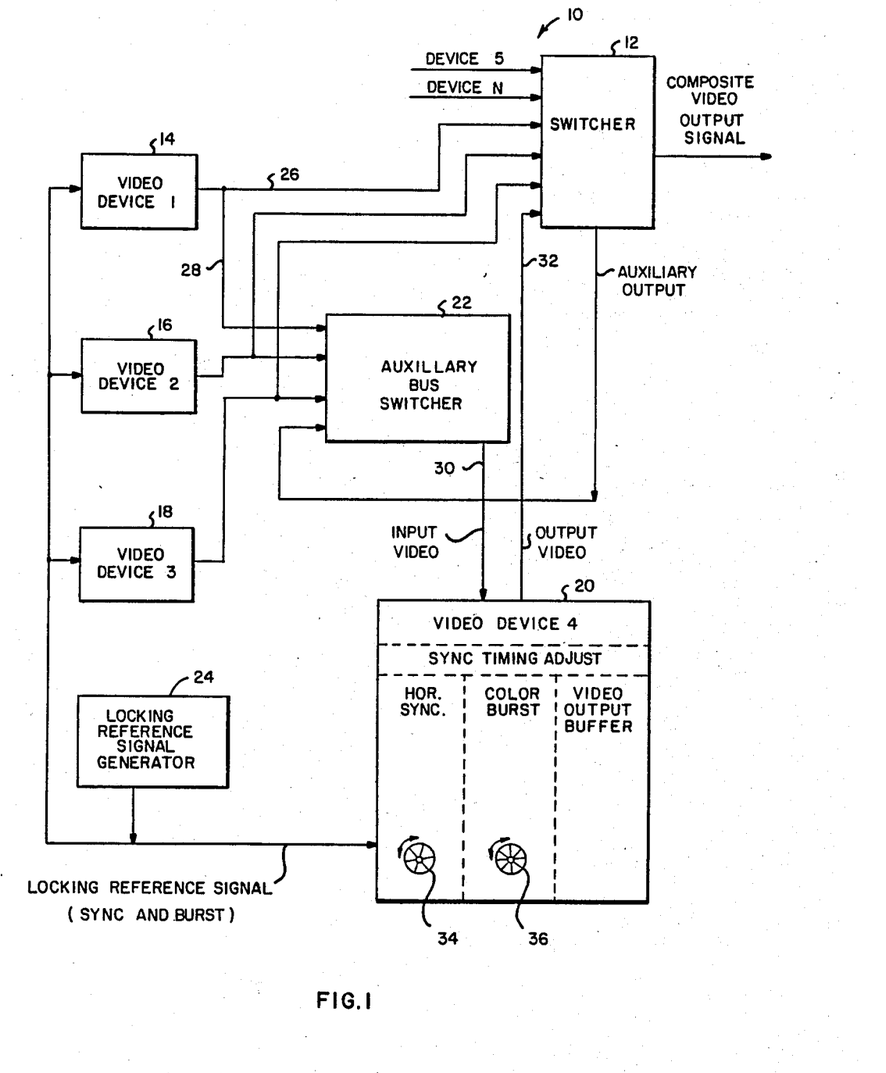
FIG. 1 is a block diagram representation of a commercial television studio including a video device in accordance with the invention.

Referring now to FIG. 1, a typical commercial television studio 10 includes a switcher 12 and a plurality of video devices 14, 16, 18 and 20 coupled thereto. The switcher 12 may, for example, be an Ampex Model AVC video switcher. Although only four video devices are shown by way of example, the switcher 12 may typically have up to 24 such devices connected as inputs to the switcher. The switcher responds to operator control to generate a composite video output signal as a function of the input signals. For example, the video devices may be cameras, recorders, transmission receivers, video special effects devices or other devices which generate or manipulate video television signals. The switcher may operate to pass any one of the input signals to the output or may operate to generate the output signal as a function of two or more of the video input signals. For example, a split screen effect may be achieved by generating half of the output video image from one input signal and the other half from a second input signal. Some of the input signals may carry key signals commanding the switcher to feed a given input to the output when the key signal has a logic true state.

The switcher 12 includes an auxiliary bus switcher 22 which receives four input signals in the form of composite video signals from first, second and third video devices 14, 16 and 18 and a selected auxiliary output from switcher 12. Auxiliary 22 switches 22 operates to pass a selected one of the four video input signals to an output port for communication as a composite video signal to the fourth video device 20 which in general may be any device which transforms or processes the video signal which is input thereto. The transformed video signal output by the fourth video device 20 is coupled to one of the inputs of switcher 12. In the present example it will be assumed that the fourth video device 20 is a digital special effects device such as is disclosed in U.S. patent application Ser. No. 634,177 filed July 24, 1984 by Gabriel and Evans for "System For Spatially Transforming Images", now U.S. Pat. No. 4,631,750, which is a continuation of Ser. No. 310,907, now abandoned. Such a system receives frames of input video data, transforms the images represented thereby by translation, enlargement, reduction, rotation or as otherwise commanded by an operator, and outputs the transformed video image as a composite video signal with a nominal phase shift of one frame time. The original video special effects device as described in the referenced prior patent application thus operates synchronously throughout in response to the input video signal.

However, a further problem may arise when such a system is incorporated into a complex television studio system. In order for television sets to properly receive the broadcast composite video signal from the television studio, this signal must continuously contain certain timing components and video data components within phase tolerances as the switcher 12 switches between different input signals. If these tolerances are not maintained, effects such as rolling or color disharmony occurs as the switcher 12 switches between one input and another. The most critical of the synchronous components of the composite television signal are the horizontal sync pulse which occurs at the beginning and of each horizontal scan line, a color burst signal or color subcarrier sinewave signal which follow the initial horizontal sync signal and the video data which follows the color burst signal. Of these various signal components the most critical tolerances occur with respect to the time of occurrence of the horizontal sync signal and the phase of the color subcarrier relative to the chrominance phasing of the video data.

In order to obtain uniform phase synchronization for all of the studio devices at the various inputs to switcher 12, a locking reference signal generator 24 is provided to generate a locking reference signal which corresponds in phase and signal shape to the horizontal sync pulses and color burst component of a composite video signal. This locking reference signal is communicated to all of the video devices in order to maintain the proper phasing at the input to switcher 12. Video devices such as the first, second, and third video devices which may be cameras or recorders which generate a video signal may simply be caused to operate synchronously with the locking reference signal (in other words gen locked). With the provision of manual adjustments for the phase of both the horizontal sync signal and the color burst signal to accommodate differences in cable length, the generated video signals are readily phase synchronized at the various inputs to switcher 12.

A synchronization problem develops however with respect to a video device such as fourth video device 20, which must not only generate its own output video signal, but must operate synchronously in response to an input video signal. For example, auxiliary bus switcher 22 may be adjusted to cause the output of the first video device 14 to pass through the auxiliary bus switcher to the input of the fourth video device 20. The first video device 14 is of course properly synchronized so that the video output thereof on cable 26 is properly phase synchronized at the input to switcher 12. However, delays imposed by a cable 28 coupling the first video device 14 to auxiliary bus switcher 22, delays through auxiliary bus switcher 22, delays imposed by cable 30 coupling auxiliary bus switcher 22 to the fourth video device 20, and delays imposed by a cable 32 coupling the fourth video device 20 to the input of switcher 12 will not in general precisely equal the delay through cable 26. There may thus be a considerable phase difference between the video signal on cable 26 and the transformed signal on cable 32. Furthermore, this phase difference may in general change as auxiliary bus switcher 22 switches from one of the available input devices to another.

This problem has in the past been solved by dividing the fourth video device 20 into an input portion which is synchronized with the input video signal on cable 30 and an output portion which is synchronized in response to the locking reference signal to provide a properly phased video output signal on cable 32. However, the use of such dual synchronization within a single video device creates crosstalk, ground noise, and other problems which degrade the performance of the video device. These problems become greater and the performance degradation becomes worse as the complexity of the video device increases.

The fourth video device 20 solves this problem by operating in accordance with the invention fully synchronously with the input video signal while providing an adjustment of phase thereof at the output in response to the locking reference signal to enable the composite video signal output on cable 32 to the input of switcher 12 to be properly phase synchronized with the master sync signal notwithstanding differences in the phase synchronization of the input video signal thereto. A sync timing adjust portion of the fourth video device 20 at the output section thereof computes a phase difference between the timing of the input video signal and the timing of the locking reference signal. This timing signal is utilized to provide a phase offset adjustment for the sync generator which enables the output video signal to be properly phased with the locking reference signal while the video device system operates synchronously with the input video signal and more particularly under the control of a single 70 nanosecond pixel rate clock signal which is synchronized with the input video signal. A manual control 34 for the horizontal sync signal permits operator adjustment of the phase thereof to account for differences in the length of the connecting cable 32 while a manual control 36 similarly permits operator adjustment of the phase of the color burst reference signal.

Figure 2A:
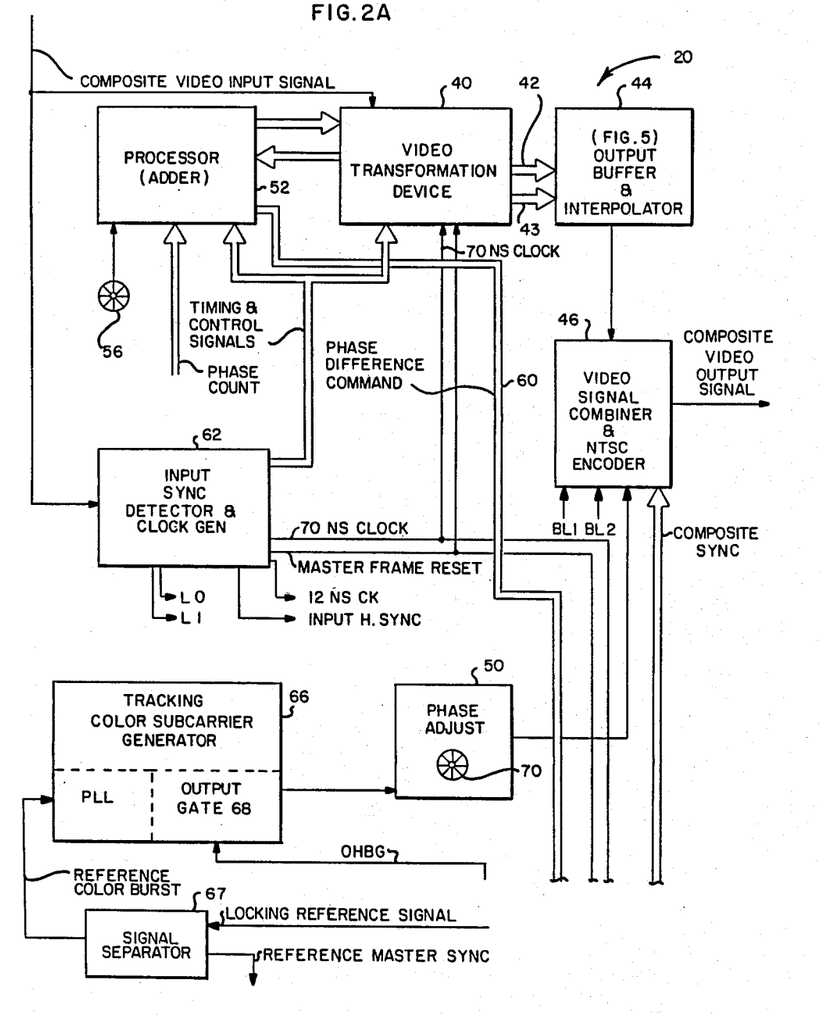
FIGS. 2A–2C are block diagrams representing a video device in accordance with the invention.
Figures 2B, 2C:
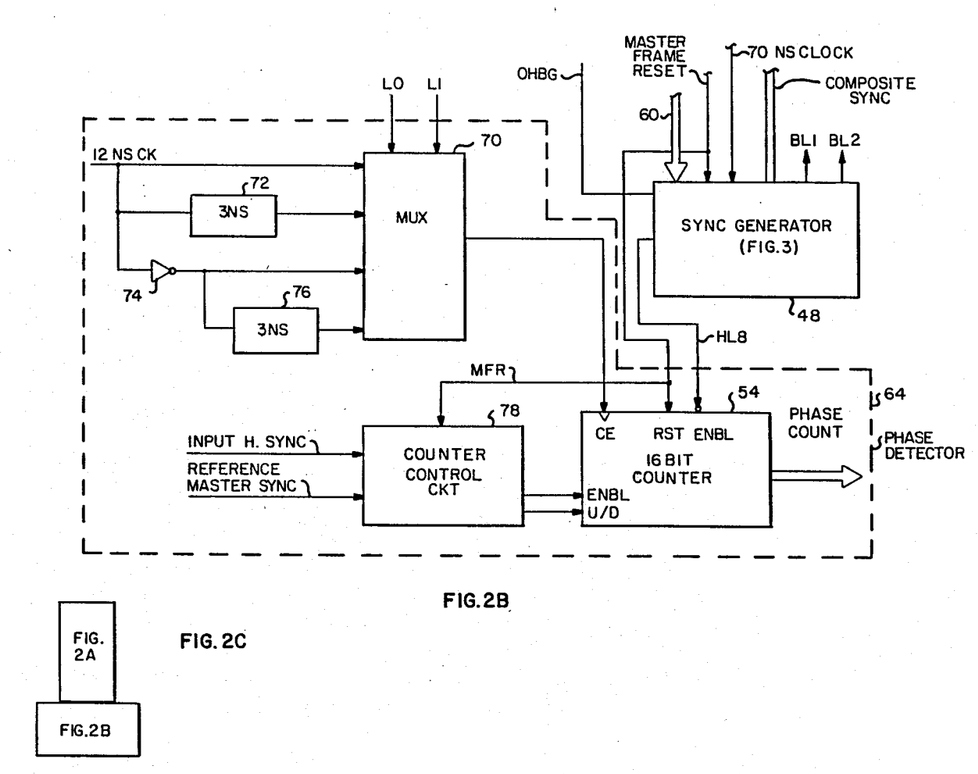

Referring now to FIG. 2, the fourth video device 20 includes a video transformation device 40 which receives the composite video input signal, and includes circuitry for processing the video data in accordance with the function of the particular transformation device and outputs a transformed video data signal on a cable or bus 42 to an output buffer and interpolator 44. Pixel addressing and control information for selecting output video data is also provided on a cable or bus 43. Output buffer and interpolator 44 may include a double line buffer or other data buffering arrangement which permits the output video data to be phase shifted by an amount which permits the composite video output signal to be phase synchronized with the locking reference signal. Preferably, the output buffer and interpolator 44 permits a phase shift corresponding to at least a horizontal blanking time interval and even greater if necessary to attain phase synchronization of the composite video output signal. Output buffer and interpolator 44 is coupled to receive video data from video transformation device 40 synchronously with the composite video input signal but delayed in phase by one frame time interval. Output buffer and interpolator 44 is further coupled to output video data to a video signal combiner 46. Signal combiner 46 operates under control of an output video blanking signal formed by combining left edge blanking signal BL1 and right edge signal BL2 generated by an output sync generator 48 to define the time interval for each horizontal scan line during which the composite video output signal is to carry video data. Video signal combiner 46 receives the video data from output buffer 44, a composite sync timing signal from sync generator 48 and a phase adjusted color subcarrier sinewave signal from a phase adjust circuit 50 to combine these signals so as to provide the composite video output signal.

A data processor 52, which may be a suitable microprocessor, is coupled to receive status information from video transformation device 40, and process that status information to provide control information back to video transformation device 40. In this regard, the exact control and data processing functions performed by processor 52 will depend upon the exact nature of video transformation device 40 and are not material to the present invention. Processor 52 also receives from a 16 bit phase counter 54 a phase count signal indicative of a phase difference between the composite video input signal and the locking reference signal. Processor 52 also receives a horizontal sync pulse phase offset adjustment from an operator controllable transducer 34 and adds this operator defined phase offset adjustment to the phase count to generate a phase difference command signal which is communicated over conductors 60 to sync generator 48. Another function performed by processor 52 is the generation of the output pixel address which is used by output buffer and interpolator 44 to select a pixel stream of output video data. With appropriate adjustment for system pipeline delays, the output pixel address is the current input pixel address (with a single frame phase delay) plus the horizontal sync manual offset adjustment plus the phase count.

An input sync detector and clock generator 62 receives the composite video input signal and responds by generating basic clock and control signals which are used for video data sampling and control throughout the fourth video device 20. These clock and control signals are thus synchronized with the input video signal and include an approximately 70 nanosecond pixel rate clock signal which is utilized for pixel rate data handling throughout the system 20. The input sync detector and clock generator 62 also generates a master frame reset signal during horizontal scan line 16 of each video frame to provide frame synchronization throughout the system 20 and prepare video data handling circuitry for the impending receipt of video data starting at horizontal line 21. Input sync detector and clock generator 62 also includes circuitry generating an approximately 12 nanosecond clock signal at six times the pixel rate clock signal, circuitry generating an input horizontal sync pulse phase locked to the sync pulses of the composite video input signal, and a binary line counter for counting horizontal lines within each frame to enable the proper generation of timing and control signals. The two least significant bits designated L0 and L1 of a horizontal line counter within input sync detector and clock generator 62 are output to a phase detector 64 for use in high resolution detection of phase differences between the composite video input signal and the master sync signal.

A tracking color subcarrier generator 66 receives the studio reference color burst signal from a signal separator 67 which receives the reference locking signal and separates the reference color burst signal and reference master sync signal therefrom. Tracking color subcarrier generator 66 includes a phase locked loop generating an output color subcarrier sinewave signal which is phase locked to the output reference color burst signal. The phase locked loop of the color subcarrier generator 66 thus continuously generates a color subcarrier sinewave signal which is phase locked with the color subcarrier of the composite video input signal. This continuously generated sinewave signal is gated by an output gate 68 within color burst generator 66 in response to an output horizontal burst gate signal OHBG generated by sync generator 48 during the time period that the color burst signal is to appear on the composite video output signal. The color burst output of color burst generator 66 is thus timed correctly relative to the output video signal in response to the input synchronized system pixel rate clock signal but phase synchronized with the composite video output reference signal. A phase adjust circuit 50 receives this color burst signal and in response to an operator controllable transducer 36 imposes a further phase adjustment thereon to enable the color burst signal to be properly phase adjusted at the input to switcher 12 notwithstanding a particular length of the cable 32 connecting the fourth video device 20 to the switcher 12.

The sync generator 48 generates the basic composite sync signals required by video signal combiner 46 in order to generate the composite video output signal. Sync generator 48 operates in response to basic timing commands provided by master frame reset signal pulses which are synchronous with the composite video input signal. However, the sync generator 48 operates to provide a phase offset relative to the master frame reset pulses determined by the phase difference command signal received from processor 52 in response to the phase count and manual phase adjust signals provided by transducer 34. Sync generator 48 operates in response to the 70 nanosecond clock signal from input sync detector and clock generator 62 which is synchronized with a composite video input signal. Sync generator 48 thus operates upon the basic device clock signal to avoid the occurrence of differently phased high speed clock signals which might result in noise interference and improper operation at various parts of the video device 20. The basic resolution of the timing for the composite video output signal is thus 70 nanoseconds. Subpixel interpolation is utilized to provide a one eighth subpixel resolution of 8.75 nsec for the output video data and the horizontal sync pulses as described below. Video blanking signals BL1 and BL2 are generated by sync generator 48 and communicated to output buffer 44 to define the output time intervals during which output buffer 44 is to communicate video data to video signal combiner 46 for inclusion in the composite video output signal. Sync generator 48 also includes a half line counter (not shown in FIG. 3) with bit 8 thereof designated HL8 being communicated to an enable input of 16 bit phase counter 54 to enable the counter 54 to operate during 128 horizontal lines of each composite video input signal frame interval.

The phase detector 64 operates during each input frame interval to generate a phase count defining a high resolution phase difference between the composite video input signal and the master sync pulse and more particularly between the horizontal sync pulse of the composite video input signal and the master sync pulse. To obtain the required resolution of the phase count signal, the basic 70 nanosecond clock signal is increased in rate by a factor of 6 to obtain an approximately 12 nanosecond clock signal which is applied as an input to a multiplexer 70. Multiplexer 70 has four inputs which are selectively gated as a single output to the clock input of counter 54. The first input of multiplexer 70 receives the 12 nanosecond clock signal while a second input receives this clock signal through a 3 nanosecond delay circuit 72 which in effect phase delays the 12 nanosecond clock signal by 90°. The third input to multiplexer 70 is coupled through an inverter gate 74 which in effect phase delays the 12 nanosecond clock signal by 180°. The fourth input to multiplexer 70 is coupled through a 3 nanosecond delay circuit 76 which in effect delays the phase inverted 12 nanosecond clock signal by 90° to provide a total phase delay of 270°. The four inputs to multiplexer 70 thus represent in effect four equally spaced phases of the 12 nanosecond clock signal. The two least significant bits of the line counter, L0, L1 select the particular input to multiplexer 70 which is gated through to the output. A different phase of the 12 nanosecond clock signal is thus selected for each horizontal line time during a sequence of four horizontal lines with the sequence then being repeated. It will be noted that signal master frame reset starts counter 54 at the 16th line of each frame and signal HL8 disables the counter 54 after the 128th line. The four phases of the 12 nanosecond clock thus produce clock signals which are accumulated over 28 horizontal lines for each phase. There is thus an averaging effect which produces an effective resolution of 3 nanoseconds at the output of counter 54 even though counter 54 responds only to the 12 nanosecond clock signal. A counter control circuit 78 is periodically reset by the master frame reset pulse and receives the input horizontal sync signal and the master sync signal to selectively enable counter 54 and control the direction of counting for counter 54. Counter 54 thus counts during lines 17–128 of each frame during the time interval between the generation of each input horizontal sync pulse and the master sync pulse. In the event that the master sync pulse should precede the input horizontal sync pulse in phase, counter control circuit 78 causes counter 54 to count down to provide a two's complement negative number representation of the phase difference between the two sync signals. At the end of 128 horizontal lines, the phase count signal stored by 16 bit counter 54 thus represents a high resolution phase difference between the input horizontal sync signal and the master sync signal which may be sampled by processor 52 to generate a phase difference command to be used in phase synchronizing sync generator 48 to the master frame reset signal during the succeeding video frame. Because of the use of time averaging of the four phases of the 12 nanosecond clock signal over 112 horizontal lines, the phase count signal has an effective resolution of 1/24th the 70 nanosecond period of the pixel clock signal. That is, the resolution of the phase count signal is approximately 3 nanoseconds.

The accumulated phase count for each one pixel phase offset is 6 counts per line times 112 lines equal 672. Since $8 \times 84 = 672$, division of the phase count by 84 results in a one eighth subpixel accuracy. The processor 52 is therefore programmed to rationalize the received phase count by dividing the phase count by 84 to provide a rationalized phase count having an 8 part subpixel accuracy. The three least significant nonfractional bits of the rationalized phase count thus represent a fractional one eighth pixel offset while the remaining bits represent a phase offset of an integral number of pixels.

Figure 3A:
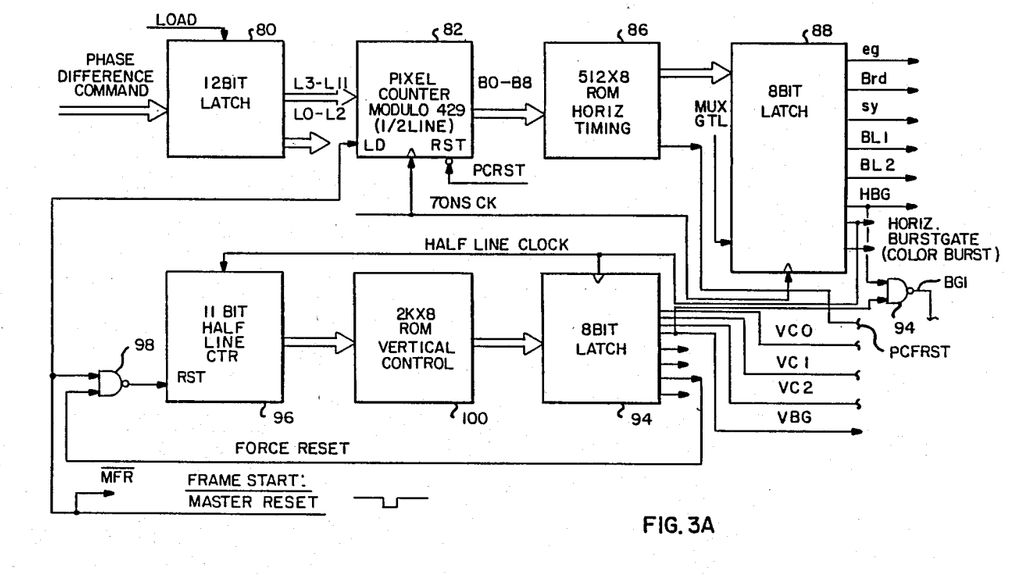
FIGS. 3A and 3B are block diagram representation of a synchronization signal generator for the video device shown in FIG. 2.
Figure 3B:
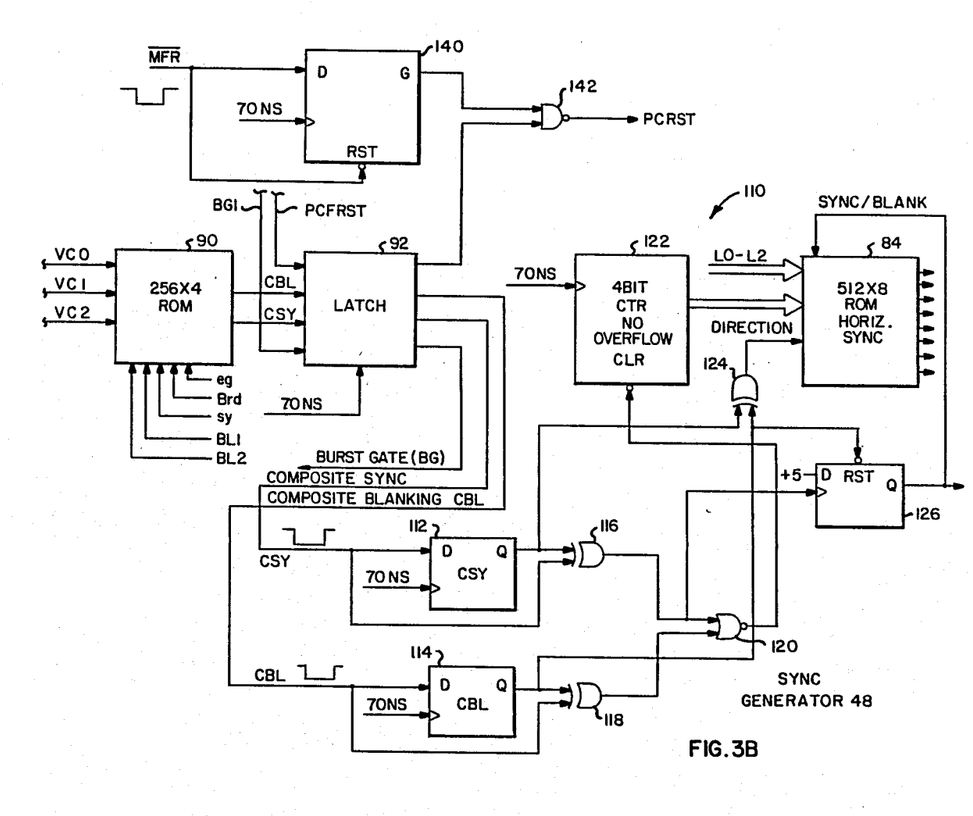

The sync generator 48 is shown in greater detail in FIG. 3 to which reference is now made. Between line 128 of each frame when counter 54 is disabled by signal HL8 and the occurrence of the master frame reset pulse for the next frame, processor 52 (FIG. 2) samples and rationalizes the phase count of counter 54, adds the manual adjustment defined by transducer 56 and loads the resulting twelve bit phase difference command into a twelve bit latch 80 to control the relative phase synchronization of the composite video output signal for the forthcoming frame. Upon the occurrence of the master reset pulse during line 16 of the next field, the integral pixel portion of twelve bit latch 80 is loaded into a modulo 429 half line counter 82 which immediately begins counting in response to the 70 nanosecond pixel clock. Half line counter 82 is reset each half line by a signal PCRST and, because each field is an integral number of half lines, recycles at the start of each field of the composite video output signal.

Although counter 82 is clocked by the 70 nanosecond system clock signal, the phase adjustment provided by the phase difference command phase synchronizes the state of counter 82 with the master sync signal within the 70 nanosecond resolution of the clock signal to enable counter 82 to control the phase of the sync generator 48 to provide proper phase synchronization for the composite video output signal.

Although a non-zero count will typically be loaded from latch 80 into counter 82 upon the occurrence of the master reset pulse, because the required relative phase of the output signal and input signal will remain substantially constant for a given cabling configuration, the counter 82 will operate with very slight, if any, discontinuity. For example, if a count of 75 is loaded from latch 80 into counter 82, during the succeeding frame time interval counter 82 will recycle at the end of field 1, recycle again at the end of field 2 and then count back up to 74 before the occurrence of the next master reset pulse. Assuming that relative phase timing conditions have not changed, by this time the phase difference command of 75 for the next frame will have been again loaded into 12 bit latch and upon the occurrence of the next clock signal, the number 75 will be transferred from 12 bit latch 80 into counter 82. Since this would have been the next count anyway there is no discontinuity in the count or corresponding phase relationship produced by counter 82. While minor changes in studio conditions may cause small changes in the phase difference command count, these differences would be expected to be limited to at most 1 or 2 counts so that the recycling of counter 82 remains substantially continuous. In fact, it is desirable that the processor 52 implement a hysteresis algorithm in generating the phase difference command so that differences of 1 or 2 counts in the phase count signal are ignored and the phase difference command remains stable and avoids limit cycling or "hunting" among phase differences of 1 or 2 counts.

It will be recalled that the resolution of the phase difference command exceeds the resolution of the 70 nanosecond clock signal by a factor of 8. This corresponds to 3 binary bits and the 3 least significant binary bits L0–L2 from 12 bit latch 80 are not communicated to counter 82 but are instead communicated directly to a 512 by 8 horizontal sync ROM 84. These three least significant bits are utilized to provide a subpixel resolution for the timing of the horizontal sync pulses in a manner which will be described below.

In response to the instantaneous count stored by half line counter 82 and represented by output bits B0–B8, a 512 by 8 horizontal timing ROM 86 generates horizontal output timing signals which are latched by an 8 bit latch 88 in response to the 70 nanosecond pixel rate clock signal. The signals generated by ROM 86 and latched by 8 bit latch 88 are well known to persons skilled in the television art, but will be described briefly for completeness. A signal eq defines a continuous stream of equalizing pulses while signal sy generates a similar continuous stream of synchronizing pulses. Signal Brd provides one broad pulse per video line in accordance with known standards. Signals BL1 and BL2 provide the lefthand and righthand blanking pulses respectively to define the time interval during which video data occur for each horizontal line. Signal OHBG is the horizontal burst gate signal which defines the time interval for each horizontal line during which the color burst signal is generated for the composite video output signal. ROM 86 also generates a half line clock signal which is used to control a vertical portion of the sync generator 48. The signals eq, Brd, sy, BL1 and BL2 are communicated as address inputs to a 256 by 4 horizontal timing ROM 90. An 8th output bit from horizontal timing ROM 86 is communicated as signal PCFR57 not to latch 88 but to a latch 92 which operates under control of the 70 nanosecond pixel clock signal to also receive and latch a composite sync signal from ROM 90, a composite blanking signal from ROM 90, and a burst gate signal B01 from a NAND gate 93 having its two inputs driven by the horizontal burst gate signal OHBG from latch 88 and the vertical burst gate signal VBG from an 8 bit latch 94. The signal PCFRST is applied through the latch 92 and a NAND gate 142 to form the counter reset pulse PCRST. To permit loading of the counter 82 without reset, the inverted master frame reset signal is applied by way of a D flip-flop 140 to disable the NAND gate 142 during the loading cycle.

An 11 bit half line counter 96 counts half lines for each frame in response to the half line clock signal from 8 bit latch 88. Half line counter 96 is coupled to be reset by a NAND gate 98 in response to either the master frame reset pulse or a force reset signal generated at the 7th output of 8 bit latch 94. This force reset signal causes the sync generator 48 to continue cycling even if the master reset signal fails to occur for some reason. A 2K by 8 vertical control ROM 100 receives the 11 bits stored by half line counter 96 as an address input and responds by generating an 8 bit output which is latched by the latch 94 under control of the half line clock. In addition to the force reset and vertical bust gate signals, vertical control ROM 100 generates 3 vertical control signals designated VC0, VC1, and VC2. These vertical control signals are connected as further address inputs to ROM 90 to enable the generation of the composite sync and composite blanking signals.

A sync/blank signal generator circuit 110 includes the horizontal sync ROM 84 which operates on a time multiplex basis to generate both the horizontal sync pulse and blanking signals.

In the quiescent condition, the composite sync signal CSY and composite blanking signal CBL are both high so that CSY flip flop 112 and CBL flip flop 114 are both set. Under this condition Exclusive-OR gate 116, which receives a one input from the Q output of CSY flip flop 112 and the other input from signal CSY directly, produces a logic low output with both inputs high. Similarly, an Exclusive-OR gate 118 receives one input from the Q output of CBL flip flop 114 and the other input directly from signal CBL. Under this condition, both inputs to Exclusive-OR gate 118 are high so that the output is low. A NOR gate 120 has its two inputs coupled to receive the outputs of the differentiating Exclusive-Or gate 116 and Exclusive-OR gate 118. Since both of these outputs are low, the output of NOR gate 120 is high. This output is coupled to the active low clear input of a four bit counter 122. This high input to the active low clear input of counter 122 has no effect so that the four bit counter remains in its maximum count state of 15 under quiescent conditions. An Exclusive-OR gate 124 has one input coupled to the Q output of CSY flip flop 112 and the other input coupled to the Q output of CBL flip flop 114. Under the quiescent condition both of these inputs are high so that the output of Exclusive-OR gate 124 is low. This signal is a direction signal which is coupled as an address input to 512 by 8 horizontal sync ROM 84. This direction input defines whether the horizontal sync ROM is to generate the leading edge or the trailing edge of the horizontal sync pulse. A sync/blank flip flop 126 controls the time division multiplexing of circuit 110 in either a sync mode or a blanking signal mode. Under the quiescent conditions, the logic 1 Q output of CBL flip flop 114, which is coupled to the active low reset input of flip flop 126, has no effect and the state of flip flop 126 remains the same as it was when the last operation terminated or in effect is undefined. The D input of flip flop 126 is connected to logic 1 so that the occurrence of a clock input which is responsive to the output of Exclusive-OR gate 116 causes flip flop 126 to set.

The composite sync signal defines the time of occurrence of the horizontal sync pulse within the resolution of the 70 nanoscond pixel clock signal. Signal CSY undergoes a leading edge high to low transition concurrently with the pixel clock. This occurs too late for flip flop CSY 112 to immediately respond so that for one clock period following this transition Exclusive-OR gate 116 receives a logic 0 input from signal CSY and a logic 1 input from the Q output of CSY flip flop 112. It thus in effect differentiates the CSY signal by generating a 70 nanosecond pulse which is communicated through NOR gate 120 to reset four bit counter 122. Upon the occurrence of the first clock signal following the leading edge of CSY, flip flop CSY 112 loads logic 0 to terminate the active clear pulse input to four bit counter 122. The resetting of flip flop 112 also causes the direction signal output by Exclusive-OR gate 124 to go from logic 0 to logic 1 to define a leading edge as opposed to a trailing edge for the horizontal sync signal. The low to high transition at the output of Exclusive-OR gate 116 upon the occurrence of the high to low leading edge transition in signal CSY creates a clock signal edge at flip flop 126 to set that flip flop to the 1 state. The Q output of flip flop 126 thus assumes a logic 1 defined state that is communicated as an address input to 512 by 8 ROM 84 to cause the addressing of the upper half addresses of the ROM which define the horizontal sync pulse. The lower half addresses are used at mutually exclusive time intervals to define blanking signal pulses.

With the clear signal input to counter 122 now inactive high, the second 70 nanosecond pixel clock pulse following the leading edge transition in signal CSY causes counter 122 to increment to state 1 and each successive clock pulse causes counter 122 to continue incrementing until it reaches a maximum count of 15. As the horizontal sync ROM 84 counts through the 16 states defined by count states 0–15, horizontal sync ROM 84 outputs a sequence of 16 eight bit binary coded signals defining the instantaneous magnitude of the horizontal sync pulse.

The three least significant bits L0–L2 of the phase difference command signal are provided as address inputs to horizontal sync ROM 84. These three bits define eight different sets of address states which enable the ROM 84 to generate eight different sets of magnitude values, depending upon the state of signals L0–L2, as counter 122 counts from 0 to 15 (see FIG. 4). These eight different states, which are dependent upon the subpixel resolution three least significant bits of the phase difference command signal, provide the subpixel phase synchronization for the horizontal sync signal.

Figure 4:
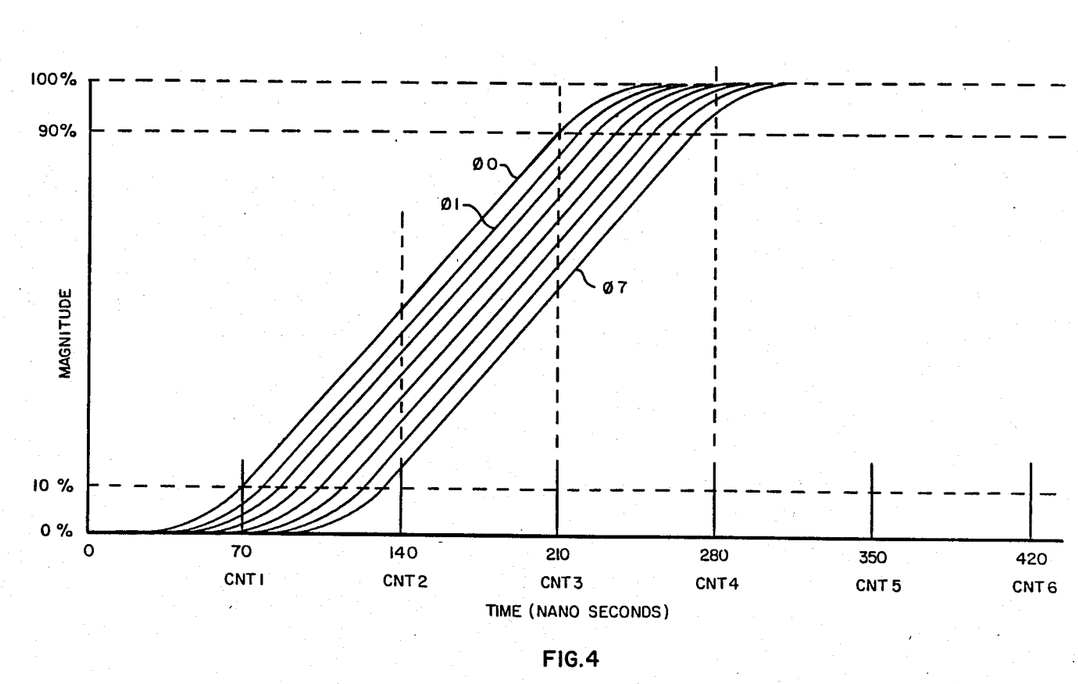
FIG. 4 is a waveform timing diagram that is useful in understanding the operation of the synchronization signal generator shown in FIG. 3.

To better understand the implementation of this subpixel timing arrangement, reference is made to the timing diagram illustrated in FIG. 4. FIG. 4 illustrates eight different phases designated 0O-07 for the leading edge of the horizontal sync signal. It will be appreciated that FIG. 4 is presented in terms of magnitude and that although the leading edge is shown increasing in magnitude, the horizontal sync signal may in fact be a negative going signal.

Established television standards require that the horizontal sync signal occur at a precise time period within each horizontal scan line of a video signal and have a 140 nanosecond rise time between its 10% and 90% values. It will be noted that the phase 0 waveform is shown to be at its 10% value at the first occurrence of the pixel clock pulse 70 nanoseconds (count 1) after counter 122 is enabled by the disappearance of the reset pulse output from NOR gate 120. 140 nanoseconds later at time 210 nanoseconds (count 3), waveform phase 0 is at 90% of maximum value. In the present example, the eight bit output of ROM 84 has a maximum value of 255. Therefore, for waveform phase 0 count 0 would address a word defining value 0, count 1 would address a word defining a magnitude of 10% of maximum value or 26, count 2 would address a word defining a magnitude of 50% of maximum value or 127, count 3 would address a word defining a magnitude of 90% of maximum value or 229, and counts 4–15 would address words defining the maximum value of 255.

For subsequent phases the word addressed by each count state would have a progressively lower magnitude. For example, for waveform phase 1 count 0 would correspond to a magnitude of 0, count 1 would correspond to a magnitude of about 6% or a magnitude of 15 and so forth. It can thus be seen that by storing eight sets of values corresponding to each of eight sets of 16 address groups within horizontal sync ROM 84, the effective phase resolution of the horizontal sync signal can be ⅛ of a 70 nanosecond pixel clock while operating all of the output timing circuitry in response to the 70 nanosecond pixel clock, which is phase synchronized to the composite video input signal.

The trailing edge of the horizontal sync pulse is similarly defined by a resolution of ⅛th of a 70 nanosecond pixel clock signal, except that the output of ROM 84 is arranged in order of decreasing magnitude rather than increasing magnitude. Upon the occurrence of the low to high transition in signal CSY to define the termination of the horizontal sync pulse, Exclusive-OR gate 116 generates a 70 nanosecond reset pulse which is communicated through NOR gate 120 to activate the clear input to counter 122. 70 nanoseconds after the trailing edge of signal CSY, flip flop CSY 112 is clocked to the reset state to terminate the reset pulse output by Exclusive-OR gate 116 and to change the direction signal input to horizontal sync ROM 84 from logic 1 to logic 0. since both inputs to Exclusive-OR gate 124 are now at logic 1. The termination of the counter reset pulse enables counter 122 to increment to state 1 at the second clock pulse following the trailing edge of signal CSY and to continue incrementing to the maximum count of 15 with each successive occurrence of the pixel clock signal. The change of the direction address input to horizontal sync ROM 84 causes the ROM to be addressed at a group of locations defining the trailing edge rather than the rising edge of the horizontal sync pulse.

Although not expressly shown, the trailing edge waveforms are provided as 8 successively phased waveforms dependent upon the 8 different states of the least significant bits of the phase difference command signal L0-L2 as shown in FIG. 4 for the rising edge, except that the magnitude states output by ROM 84 begin at maximum count and decrease to zero. The composite blanking pulse signal occurs at times which are mutually exclusive of the composite sync pulse signal so that the sync blank signal generator circuit 110 can be utilized for both functions. The occurrence of the high to low transition at the leading edge of signal CBL causes flip flop 114 to reset at the next clock pulse and to generate a logic 0 Q output which is communicated to the actual low reset input of sync blank flip flop 126. Flip flop 126 is thus reset so that its Q output changes from logic 1 to logic 0 to address a portion of ROM 84 storing blanking information rather than sync information. The operation of the circuit 110 during the blanking interval is similar to the operation during the horizontal sync interval and will not be further described.

Figure 5:
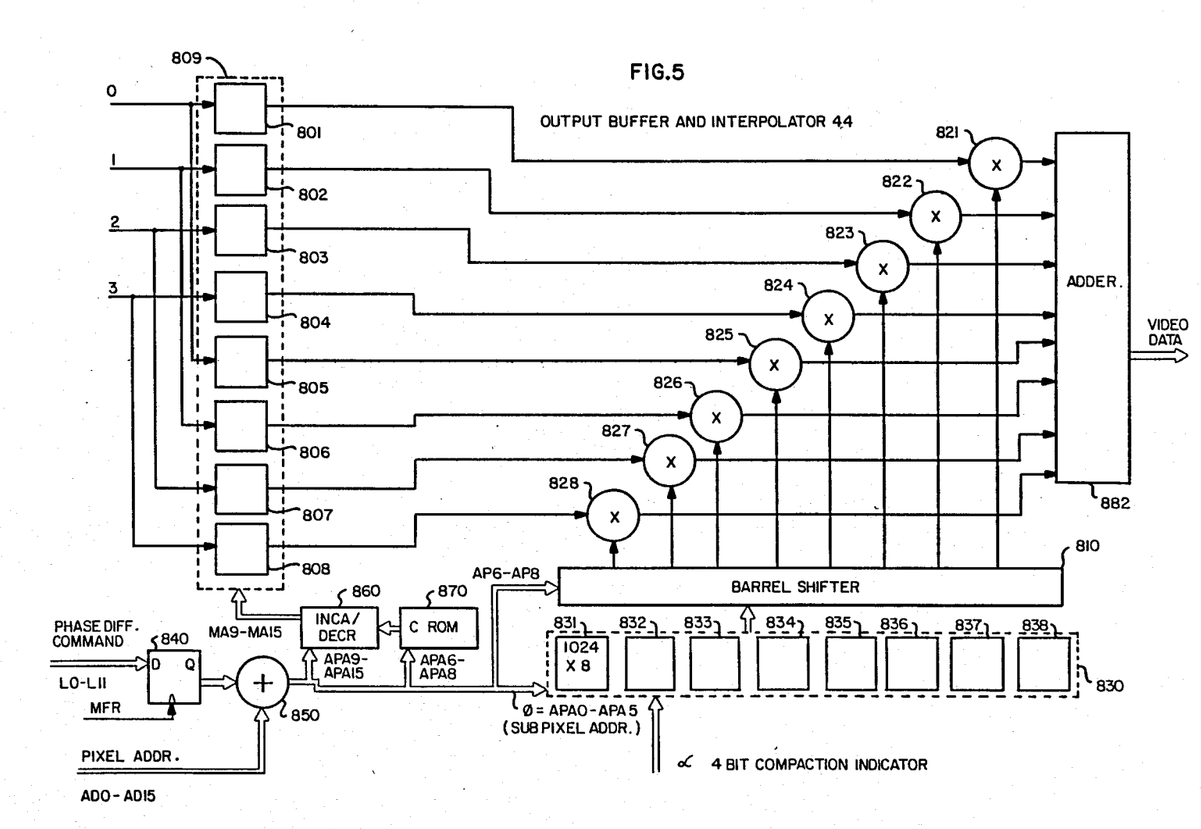
FIG. 5 is a block diagram representation of an output buffer and interpolator shown in FIG. 2A.

Output buffer and interpolator 44 is shown in greater detail in FIG. 5. Except for the adjustment of pixel addresses in response to the phase difference command and the elimination of predecimation, output buffer and interpolator 44 is similar to the interpolation decimation filter 800 shown in FIG. 10 of the above-referenced U.S. patent application Ser. No. 634,177, filed July 24, 1984 by Gabriel and Evans for "System For Spatially Transforming Images".

A double line buffer 809 includes eight individually addressable components 801-808. Video data is received four pixels at a time in parallel and written alternately into the top components 801-804 and then into the lower components 805-808. Consequently, upon receiving all of the pixels for a video line, the first eight pixels are stored in sequential order at address 0, the next eight pixels are stored in sequential order at address 1, the next eight pixels are stored in sequential order at address 2 and so forth. After one buffer of the double buffers is loaded with data, it remains available for outputting data while the other buffer receives the next line of data.

Output buffer and interpolator 44 is an eight point interpolator filter which receives 16 bit source addresses AD0-AD15 from an address generator (not shown) which is part of the video transformation device 40, adds the pixel address to the phase difference command and utilizes the resulting adjusted pixel address APA0-APA15 to generate a pixel of filtered output video data.

The adjustment for the phase difference command is implemented in the present example with a register 840 which receives the phase difference command L0-L11 and loads this command in response to the master frame reference signal MFR at line 16 of each video frame. The output of register 840 drives an adder 850 which receives as a second input the pixel address signal AD0-AD15. Since the pixel address signal carries six bits of subpixel addressing while the phase difference command carries three bits of subpixel addressing the two signals must be added with bit L0 corresponding to bit AD3 and bit L11 corresponding to bit AD14. The resulting adjusted pixel address is thus a 16 bit number with six bits of subpixel addressing and 10 bits of integer pixel addressing. The subpixel address bits APA0-APA5 are communicated as a partial address input to a filter coefficient memory 830 having ROM components 831-838 storing filter coefficients corresponding to the eight points of each filter operation. The three least significant integer bits AP6-AP8 are communicated to a barrel shifter 810 which shifts the eight coefficient outputs from coefficient memory 830 so as to provide an alignment with the addressed video data stored in double line buffer 809. The filter coefficients are generated as if filter ROM component 834 corresponds to the video pixel which is next smaller than or equal to the actual pixel address point. The coefficient memory outputs must then be rotated so that this point in fact matches the actual pixel output by line buffer 809 which is most nearly equal to or less than the actual pixel address. For example, a pixel address of 7.5 would require alignment of the output of ROM 834 with the output of line buffer component 808 for multiplication by a multiplier 828. Other alignments would be required depending upon the particular pixel address. In any event, the three least significant integer bits of the pixel address define the position within buffer 809 of the pixel which is most nearly less than or equal to the adjusted pixel address and determine the number of positions which the coefficient outputs must be shifted by barrel shifter 810 in a manner known to those skilled in the art.

Unless the pixel which is most closely less than or equal to the adjusted pixel address is stored within memory component 804, the eight pixels which are closest to the adjusted pixel address will cross a modulo 8 boundary and will not all be stored at the same hard address within line buffer memory 809. Depending upon the actual adjusted pixel address, some pixels may be stored at the actual adjusted pixel address, some may be stored at the next higher address, or some may be stored at the preceding address. To accommodate these modulo 8 boundary overlaps, a carry ROM 870 receives the three least significant integer bits APA6-APA8 of the adjusted pixel address and outputs in response thereto seven carry signals which correspond to the individual memory components of line buffer 809 to indicate whether or not the address actually received by the first three memory components 801-804 should be decremented relative to the adjusted pixel address and whether or not the four addresses actually received by the memory components 805-808 should be incremented relative to the adjusted pixel address. An increment/decrement circuit 860 responds to the output of C ROM 870 as well as the adjusted pixel address bits APA9-APA15 to generate the actual memory address bits MA9-MA15. The output of increment/decrement circuit 860 corresponds to the seven most significant bits of the integer portion of the pixel address and represents the full picture address divided by eight in correspondence to the eight different components of the double line buffer 809 which store eight pixels of video data at each memory address.

Eight multipliers 821-828 receive the eight outputs from the eight memory components 801-808 and also the corresponding eight coefficients from barrel shifter 810 to multiply each pixel of video data by its corresponding filter coefficient with the product being presented to an adder 882 which sums the eight products to generate a pixel of video data.

The coefficient memory 830 receives as four additional address bits an alpha signal which provides a four bit compaction indicator defining the amount of compaction of the output video data relative to the video data stored by line buffer 809. Coefficient memory 830 thus in effect stores 16 different filter functions which vary according to known principles with the amount of compaction which is being imposed upon the received video data. For example, a full sized or larger output picture would put great weight upon the pixels nearest the adjusted pixel address and very little weight on the pixels farthest away. On the other hand, for compaction by a large number such as 16, nearly equal weight would be given to all eight pixels sampled by the interpolation filter 44. In addition, the 6 bit subpixel address selects one of 64 subpixel points for the selected one of 16 filter functions to generate the actual coefficient which is multiplied by the corresponding pixel input value.

It should be further appreciated that although the register 840 and adder 850 are included as part of the output buffer and interpolator 44 to illustrate the adjustment of the pixel address in response to the phase difference command, this adjustment could also occur as part of the pixel address generation by the video transformation device 40.

While there has been shown and described above a particular arrangement of a synchronization circuit for a video device, the invention is not limited thereto. Accordingly, any modifications, variations or equivalent arrangements within the scope of the attached claims should be considered to be within the scope of the invention.

What is claimed is:

1. A video device synchronization system for synchronizing an output signal in response to periodically occurring input video sync signals and respective periodically occurring input reference timing signals externally developed independently of said input video sync signals, said system comprising a phase detector responsive to the phase of the periodically occurring input video sync signals and the phase of the respective periodically occurring reference timing signals to generate an average phase difference signal representing an average of phase differences between separate ones of a multiplicity of said periodically occurring input video sync signals and respective said periodically occurring reference timing signals, said phase detector including means responsive to the phase of one of said periodically occurring input video sync signals and the phase of a respective one of said periodically occurring reference timing signals for producing a respective individual phase difference signal representing the difference in the respective phases, and means for combining multiplicity of said individual phase difference signals to generate said average phase difference signal; and a signal utilization device responsive to the average phase difference signal for providing the output signal at a phase relative to the phase of the periodically occurring input video sync signals determined by the average phase difference signal.

2. A video device synchronization system according to claim 1 wherein the periodically occurring input video sync signals are horizontal sync signals included in an input composite video signal that define line intervals of video data; and wherein the reference timing signals comprise periodically occurring timing signals.

3. A video device synchronization system according to claim 2 wherein the signal utilization device comprises a video storage device coupled to receive and temporarily store lines of video data; and wherein the video data storage device is responsive to the average phase difference signal to provide said output signal comprised of said stored lines of video data at times determined by the average phase difference signal.

4. A video device synchronization system according to any one of claims 1 to 3 comprising clock means for generating periodic clock pulses, phasing means responsive to said periodic clock pulses for providing phased clock pulses at each of a plurality of clock phases equally spaced in a clock period, said means for producing said individual phase difference signal including counting means for counting the number of said phased clock pulses at a respective one of said plurality of clock phases occurring between respective said periodically occurring input video sync signals and said periodically occurring reference timing signals, and said means for combining including means for accumulating the count of said counting means over a multiplicity of said individual phase difference signals corresponding to different ones of said plurality of clock phases to provide resolution in said average phase difference signal less than a said clock period.

5. A video device synchronization system according to claim 4 in which said phasing means includes means for delaying said periodic clock pulses by different delayed clock pulses, and multiplexing means for selecting said differently delayed clock pulses at respective said phased clock pulses.

* * * * *